(12) United States Patent
Tanabe et al.

(10) Patent No.: US 12,355,493 B2
(45) Date of Patent: Jul. 8, 2025

(54) SIGNAL CONVERTING APPARATUS AND SIGNAL CONVERTING METHOD

(71) Applicant: NIPPON TELEGRAPH AND TELEPHONE CORPORATION, Tokyo (JP)

(72) Inventors: Akihiro Tanabe, Musashino (JP); Toshiaki Shitaba, Musashino (JP); Yoichi Fukada, Musashino (JP); Tomoaki Yoshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 240 days.

(21) Appl. No.: 18/026,409

(22) PCT Filed: Sep. 18, 2020

(86) PCT No.: PCT/JP2020/035385
§ 371 (c)(1),
(2) Date: Mar. 15, 2023

(87) PCT Pub. No.: WO2022/059159
PCT Pub. Date: Mar. 24, 2022

(65) Prior Publication Data
US 2023/0370167 A1 Nov. 16, 2023

(51) Int. Cl.
*H04B 10/54* (2013.01)
(52) U.S. Cl.
CPC .................... *H04B 10/54* (2013.01)
(58) Field of Classification Search
CPC .................. H04B 10/54; H04B 10/548; H04B 10/2575
See application file for complete search history.

(56) References Cited

U.S. PATENT DOCUMENTS

2001/0048541 A1* 12/2001 Ishii ................... H04B 10/2507
398/201
2005/0244155 A1* 11/2005 Kikushima .......... H04B 10/548
398/41

(Continued)

FOREIGN PATENT DOCUMENTS

JP 2005340893 A * 12/2005

OTHER PUBLICATIONS

"Transmission equipment for transferring multi-channel television signals over optical access networks by frequency modulation conversion", Recommendation ITU-T J.185, p. 9 and p. 17, 2012.

*Primary Examiner* — Pranesh K Barua
(74) *Attorney, Agent, or Firm* — Harness, Dickey & Pierce, P.L.C.

(57) ABSTRACT

A signal converting apparatus includes a conversion unit, a measurement unit, and a control unit. The conversion unit performs FM batch conversion on an input signal containing a plurality of carrier signals, to generate an FM signal. The measurement unit measures the carrier levels of the plurality of carrier signals contained in the input signal, and the maximum frequency of the input signal. The control unit calculates the frequency deviation amount of the entire input signal, on the basis of the measured carrier levels of the respective carrier signals. Using the calculated frequency deviation amount and the measured maximum frequency, the control unit calculates a center frequency for the FM signal, and controls the conversion unit so that the center frequency of the FM signal to be generated by the FM batch conversion becomes equal to the calculated center frequency.

6 Claims, 8 Drawing Sheets

(56) References Cited

U.S. PATENT DOCUMENTS

| | | | |
|---|---|---|---|
| 2006/0072876 A1* | 4/2006 | Kikushima | H04B 10/66 |
| | | | 385/31 |
| 2006/0116143 A1* | 6/2006 | Kikushima | H04B 10/58 |
| | | | 455/501 |
| 2007/0212073 A1* | 9/2007 | Kikushima | H04N 7/22 |
| | | | 398/79 |
| 2017/0117967 A1* | 4/2017 | Morea | H04J 14/02216 |
| 2017/0244486 A1* | 8/2017 | Han | H04B 10/2513 |
| 2018/0152248 A1* | 5/2018 | Sung | H04B 10/27 |

* cited by examiner

SIGNAL CONVERTING APPARATUS AND SIGNAL CONVERTING METHOD

CROSS-REFERENCE TO RELATED APPLICATIONS

This application is a 371 U.S. National Phase of International Application No. PCT/JP2020/035385, filed on Sep. 18, 2020. The entire disclosure of the above application is incorporated herein by reference.

TECHNICAL FIELD

The present invention relates to a signal converting apparatus and a signal converting method.

BACKGROUND ART

There are optical transmission apparatuses that perform frequency modulation (FM) batch conversion on a plurality of carrier signals, and optically modulate and transmit the converted signals. To such an optical transmission apparatus, the center frequency of the FM signal to be generated is given as a fixed value (see Non Patent Literature 1, for example). By making the center frequency of the FM signal variable within a certain frequency range, it is possible to control the center frequency from the outside. However, depending on the purpose of use, the designer or the operator needs to manually determine the center frequency on the basis of an input signal condition or experience. An optimum center frequency is not automatically set in accordance with an input signal.

CITATION LIST

Non Patent Literature

Non Patent Literature 1: "Transmission equipment for transferring multi-channel television signals over optical access networks by frequency modulation conversion", Recommendation ITU-T J.185, p. 9 and p. 17, 2012

SUMMARY OF INVENTION

Technical Problem

If the carrier signal input to an optical transmission apparatus is always the same, there would be no problem with a fixed center frequency. However, when the maximum frequency of the input signal is high, the signal quality after the FM batch conversion is degraded. Therefore, in a case where priority is given to maintaining quality (for example, a case where the carrier signal is a video signal, and it is necessary to guarantee that a video image can be viewed), a problem that the transmission distance becomes shorter arises.

FIG. 8 is a configuration diagram illustrating the internal structure of a conventional optical transmission apparatus. In signal generation through FM batch conversion, an appropriate center frequency of(c) is determined for an input signal c. However, to an optical transmission apparatus using conventional FM batch conversion, a fixed value OF is given as the center frequency of(c), regardless of the frequency of the input signal c. For example, an input signal c1 shown in (a1) is a broadcast signal using an intermediate frequency (IF) band of clockwise circularly polarized waves of satellite broadcasting. The broadcast signal contains carrier signals of different frequencies (carriers). First, the fixed value OF is the center frequency of(c1) of an FM batch conversion signal shown in (b1). That is, the fixed value OF is the center frequency of(c1) obtained by adjusting 2.1 GHz, which is the IF band of clockwise circularly polarized waves of satellite broadcasting, to the maximum frequency. If a broadcast signal using counterclockwise circularly polarized waves of satellite broadcasting is newly transmitted in addition to the above, the maximum frequency of an input signal c2 rises to a 3.2 GHz band, which is the IF band of counterclockwise circularly polarized waves as illustrated in (a2). Therefore, as illustrated in (b2), the center frequency of(c2) of an FM batch conversion signal should have a greater value than the fixed value OF. However, since a center frequency is fixed, the center frequency of(c2)' of an FM batch conversion signal generated for the input signal c2 remains OF. In this case, the low frequency range of signals spreading around OF turns into aliasing (symbol e) and is superimposed on an FM signal. This turns into noise, and signal degradation occurs.

As described above, when the right center frequency of(c) of a signal obtained after FM batch conversion is higher than the center frequency OF of a fixed value, the low-frequency component turns into aliasing, and signal quality is degraded. To solve this problem, it is necessary to shift the center frequency of the signal after FM batch conversion toward the high-frequency region, to be the right center frequency that should be obtained. By a conventional technique, however, since a center frequency is fixed, in a case where different carrier signals are input signals, it is necessary to prepare different optical transmission apparatuses capable of setting a center frequency adapted to each input signal, or to make it possible to change a center frequency from outside on an optical transmission apparatus by manual setting. In a case where a change is to be made manually, only those who deeply understand the characteristics of input signals can set appropriate values.

In view of the above circumstances, the present invention aims to provide a signal converting apparatus and a signal converting method capable of reducing degradation of an FM signal that is generated even in a case where the frequency of the signal to be subjected to FM batch conversion is variable.

Solution to Problem

One aspect of the present invention is a signal converting apparatus that includes: a conversion unit (hereinafter also referred to as "convertor") that performs frequency modulation (FM) batch conversion on an input signal containing a plurality of carrier signals, to generate an FM signal; a measurement unit (hereinafter also referred to as "analyzer") that measures carrier levels of the plurality of carrier signals contained in the input signal, and the maximum frequency of the input signal; and a control unit (hereinafter also referred to as "controller") that calculates the frequency deviation amount of the entire input signal on the basis of the measured carrier levels of the plurality of carrier signals, calculates a center frequency for the FM signal using the calculated frequency deviation amount and the measured maximum frequency, and controls the conversion unit so that the center frequency of the FM signal to be generated through the FM batch conversion becomes equal to the calculated center frequency.

One aspect of the present invention is a signal converting method that includes: a conversion step in which a conversion unit performs frequency modulation (FM) batch conversion on an input signal containing a plurality of carrier signals, to generate an FM signal; a measurement step in which a measurement unit measures carrier levels of the plurality of carrier signals contained in the input signal, and the maximum frequency of the input signal; and a control step in which a control unit calculates the frequency deviation amount of the entire input signal on the basis of the measured carrier levels of the plurality of carrier signals, calculates a center frequency for the FM signal using the calculated frequency deviation amount and the measured maximum frequency, and controls the conversion unit so that the center frequency of the FM signal to be generated through the FM batch conversion becomes equal to the calculated center frequency.

Advantageous Effects of Invention

According to the present invention, it is possible to reduce degradation of a generated FM signal even in a case where the frequency of the signal to be subjected to FM batch conversion is variable.

DESCRIPTION OF EMBODIMENTS

The following is a detailed description of an embodiment of the present invention, with reference to the drawings. A network transmission system transmits carrier signals by an FM batch conversion technology and optical modulation. A carrier signal is an electrical signal such as an RF video signal, for example. The network transmission system includes an optical transmission apparatus that generates an optical signal to be transmitted. The optical transmission apparatus includes a signal conversion unit that performs FM batch conversion on a plurality of carrier signals to generate an FM batch conversion signal, and converts the generated FM batch conversion signal into an optical signal. The signal conversion unit of this embodiment receives an input of an electrical signal, and measures and analyzes the characteristics of the input electrical signal. Using results of the measurement and analysis, the signal conversion unit determines an appropriate center frequency for an FM signal, and dynamically controls the center frequency when performing FM batch conversion. This makes it possible to minimize the signal degradation to be caused by optical signal transmission.

Figure 1:
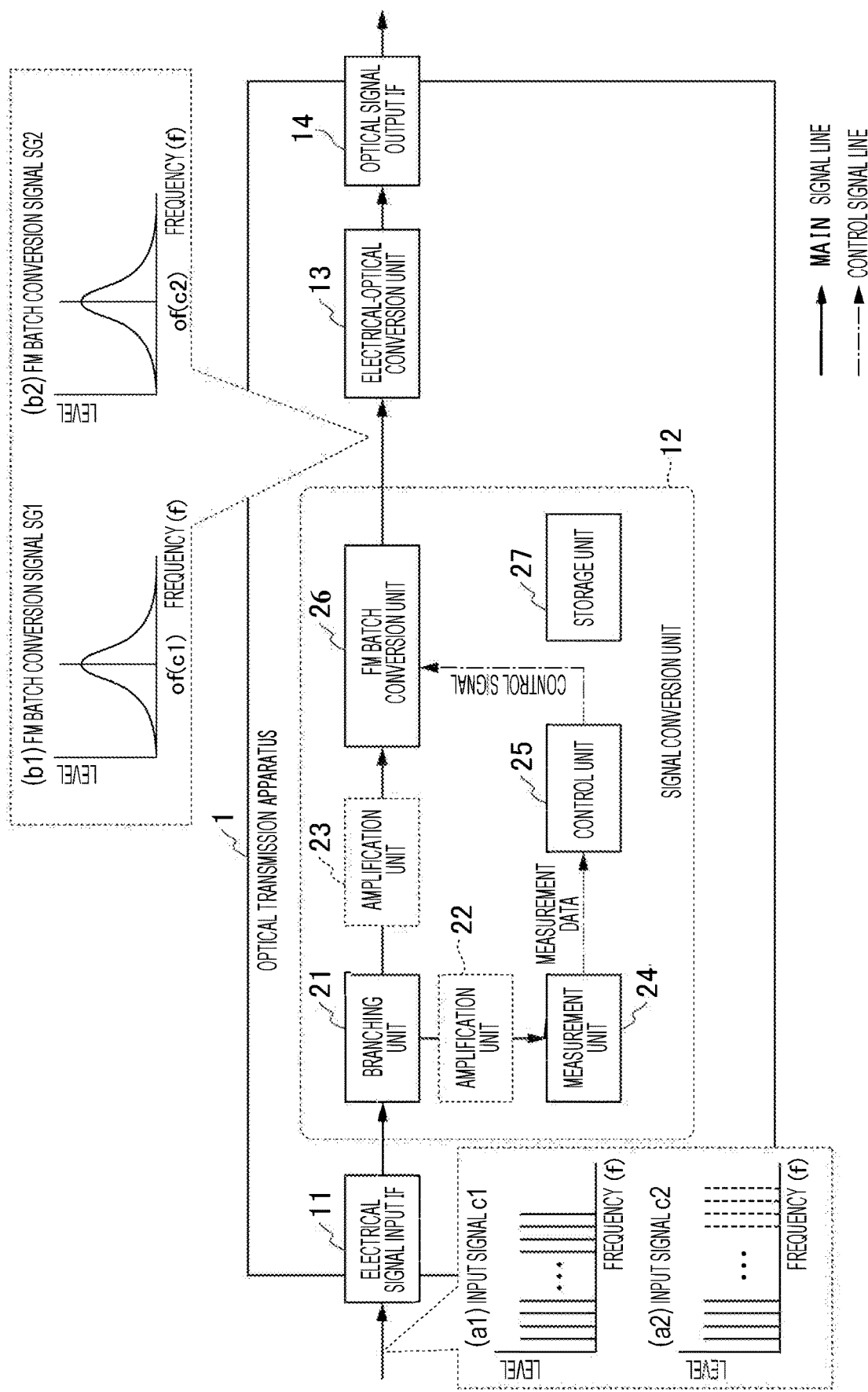
FIG. 1 is a configuration diagram of an optical transmission apparatus according to an embodiment of the present invention.

FIG. 1 is a configuration diagram of an optical transmission apparatus 1 according to an embodiment of the present invention. The optical transmission apparatus 1 is an example of a signal converting apparatus that performs FM batch conversion on an electrical signal, to generate an FM batch conversion signal. The optical transmission apparatus 1 includes an electrical signal input interface (IF) 11, a signal conversion unit 12, an electrical-optical conversion unit 13, and an optical signal output IF 14. The signal conversion unit 12 includes a branching unit 21, an amplification unit 22, an amplification unit 23, a measurement unit 24, a control unit 25, an FM batch conversion unit 26, and a storage unit 27. The signal conversion unit 12 may not include the amplification unit 22, or may not include the amplification unit 23. The storage unit 27 may be included in the measurement unit 24, or may be included in the control unit 25.

The electrical signal input IF 11 receives an input of an electrical signal, and outputs the received electrical signal to the branching unit 21. The electrical signal includes one or more carrier signals. The frequencies of the carrier signals are different from one another. The electrical signal may include signals of a plurality of frequency ranges each including one or more carrier signals. For example, the electrical signal may be a plurality of carrier signals included in the IF band (frequency range) of CS clockwise circularly polarized waves, may be a plurality of carrier signals included in the IF band (frequency range) of CS counterclockwise circularly polarized waves, or may include carrier signals of both of those frequency ranges.

The branching unit 21 splits the electrical signal input from the electrical signal input IF 11 into two signals. The branching unit 21 outputs one of the branched electrical signals to the measurement unit 24, and outputs the other electrical signal to the FM batch conversion unit 26. The amplification unit 22 amplifies the electrical signal the branching unit 21 has output to the measurement unit 24. The amplification unit 23 amplifies the electrical signal the branching unit 21 has output to the FM batch conversion unit 26.

The measurement unit 24 receives the input of the electrical signal output from the branching unit 21, and measures the data necessary for deriving the center frequency, with the input electrical signal being the measurement target. The items to be measured are the following two items: (item 1) the level of each carrier signal included in the input electrical signal; and (item 2) the maximum frequency $f_{max}$ of the input electrical signal. The measurement unit 24 outputs measurement data indicating the results of the measurement of these items, to the control unit 25.

The control unit 25 receives the measurement data from the measurement unit 24. Using the measurement data, the control unit 25 calculates the center frequency of(c) for the FM batch conversion signal to be generated by the FM batch conversion unit 26. The control unit 25 notifies the FM batch conversion unit 26 of the calculated center frequency of(c) through a control signal. Note that, although the calculation of the center frequency of(c) is based on Carson's rule (see Reference Literature 1, for example), the degree of FM modulation needs to be sufficiently smaller than 1 (see Reference Literature 2, for example).

(Reference Literature 1) The Institute of Electronics, Information and Communication Engineers, Knowledge Base, Group 5 Communication and Broadcasting, Volume 8, Broadcast and CATV, Chapter 2, Modulation scheme and transmission, pp. 11-12, [online], [searched on Aug. 19, 2020], Internet <http://www.ieice-hbkb.org/files/05/05gun_08hen_02.pdf>

(Reference Literature 2) Hisao YOSHINAGA, Toshiaki SHIABA, Naohiko YUKI, and Satoshi IKEDA, "Transmission Scheme of BS/CS 110° Signals by FM Conversion Scheme (1)—System Design—", The Institute of Electronics, Information and Communication Engineers, Society Convention 2007

The FM batch conversion unit 26 receives the input of the electrical signal output from the branching unit 21, and converts the input electrical signal into an FM batch conversion signal of the center frequency reported from the control unit 25 through the control signal. The FM batch conversion unit 26 outputs the converted FM batch conversion signal to the electrical-optical conversion unit 13. The storage unit 27 stores various kinds of setting values.

The electrical-optical conversion unit 13 converts the FM batch conversion signal input from the FM batch conversion unit 26, from an electrical signal into an optical signal. The electrical-optical conversion unit 13 outputs the converted optical signal to the optical signal output IF 14. The optical signal output IF 14 outputs the optical signal input from the electrical-optical conversion unit 13 to the outside.

In the above configuration, in a case where an input signal c1 shown in (a1) is input to the optical transmission apparatus 1, the signal conversion unit 12 generates an FM batch conversion signal SG1 having a center frequency of(c1) shown in (b1). Also, an input signal c2 shown in (a2) is input to the optical transmission apparatus 1. The input signal c2 differs from the input signal c1 in at least either the maximum frequency or the minimum frequency. In this case, the signal conversion unit 12 generates an FM batch conversion signal SG2 having a center frequency of(c2)≠of(c1) shown in (b2).

Figure 2:
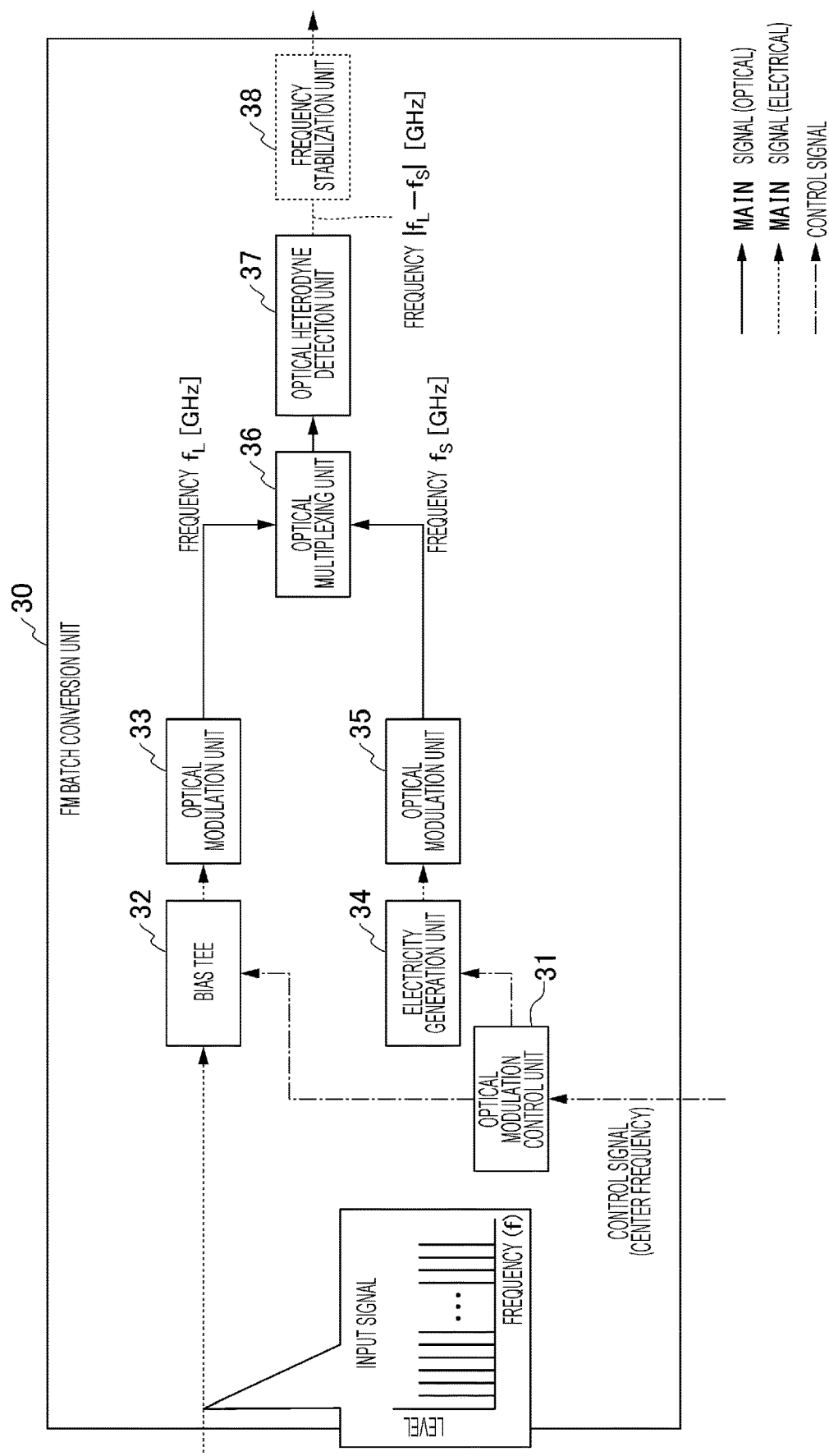
FIG. 2 is a configuration diagram of an FM batch conversion unit according to the embodiment.

FIG. 2 is a configuration diagram of an FM batch conversion unit 30. The FM batch conversion unit 30 is used as the FM batch conversion unit 26 illustrated in FIG. 1. The FM batch conversion unit 30 includes an optical modulation control unit 31, a bias tee 32 (hereinafter also referred to as "application device"), an optical modulation unit 33 (hereinafter also referred to as "first optical modulator"), an electricity generation unit 34 (hereinafter also referred to as "electricity generator"), an optical modulation unit 35 (hereinafter also referred to as "second optical modulator"), an optical multiplexing unit 36 (hereinafter also referred to as "optical multiplexer"), and an optical heterodyne detection unit 37 (hereinafter also referred to as "detector"). The FM batch conversion unit 30 may further include a frequency stabilization unit 38.

The optical modulation control unit 31 receives a control signal from the control unit 25, and acquires information about the center frequency from the received control signal. On the basis of the center frequency indicated by the acquired information, the optical modulation control unit 31 controls the current value of the current to be applied by the bias tee 32 and the current value of the electricity to be generated by the electricity generation unit 34. As a result, control is performed so that the center frequency of the FM batch conversion signal to be output via the optical multiplexing unit 36 and the optical heterodyne detection unit 37 has the value of the center frequency calculated by the control unit 25.

Specifically, the optical modulation control unit 31 controls the bias tee 32 so that the frequency of the optical signal to be output from the optical modulation unit 33 becomes $f_L$ [GHz], and controls the electricity generation unit 34 so that the frequency of the optical signal to be output from the optical modulation unit 35 becomes $f_S$ [GHz]. The optical modulation control unit 31 determines $f_L$ and $f_S$ so that the center frequency of the FM batch conversion signal of the frequency $|f_L-f_S|$ to be output from the optical heterodyne detection unit 37 becomes equal to the center frequency acquired from the control signal. For example, the optical modulation control unit 31 implements an arithmetic algorithm or a table for determining a control value for the bias tee 32 and a control value for the optical modulation unit 35, in accordance with the center frequency.

The bias tee 32 is an example of a direct-current (DC) application unit. The bias tee 32 inserts a DC current or a DC voltage into a radio-frequency circuit. The FM batch conversion unit 30 applies, under the control of the optical modulation control unit 31, a DC current or a DC voltage to the electrical signal split by the branching unit 21 after the electrical signal has been output from the electrical signal input IF 11. The bias tee 32 outputs the input signal to which a DC current or a DC voltage is applied, to the optical modulation unit 33.

The optical modulation unit 33 is a laser diode (LD), for example. The optical modulation unit 33 oscillates laser light, by injecting the current of the input signal to which a DC current or a DC voltage is applied by the bias tee 32, into the LD. As a result, the optical modulation unit 33 performs intensity modulation on the input signal to convert the input signal into an optical signal having the frequency $f_L$, and outputs the optical signal to the optical multiplexing unit 36.

The electricity generation unit 34 generates DC electricity of the current value based on the control from the optical modulation control unit 31, and outputs the generated electricity to the optical modulation unit 35. The optical modulation unit 35 is an LD, for example. The optical modulation unit 35 oscillates laser light having the frequency $f_S$ by injecting the electricity generated by the electricity generation unit 34 into the LD.

The optical multiplexing unit 36 multiplexes the optical signal of the frequency $f_L$ generated by the optical modulation unit 33 and the laser light of the frequency $f_S$ generated by the optical modulation unit 35. The optical multiplexing unit 36 outputs the optical signal generated by the multiplexing, to the optical heterodyne detection unit 37.

The optical heterodyne detection unit 37 is a photodiode (PD), for example. The optical heterodyne detection unit 37 performs optical heterodyne detection on the optical signal output from the optical multiplexing unit 36, and generates an electrical FM batch conversion signal having the frequency $|f_L-f_S|$[GHz].

The frequency stabilization unit 38 is a frequency divider or a multiplier, for example. In a case where the frequency band of the FM batch conversion signal generated by the optical heterodyne detection unit 37 is different from the target frequency, the frequency stabilization unit 38 converts the frequency of the FM batch conversion signal to the target frequency.

Figure 3:
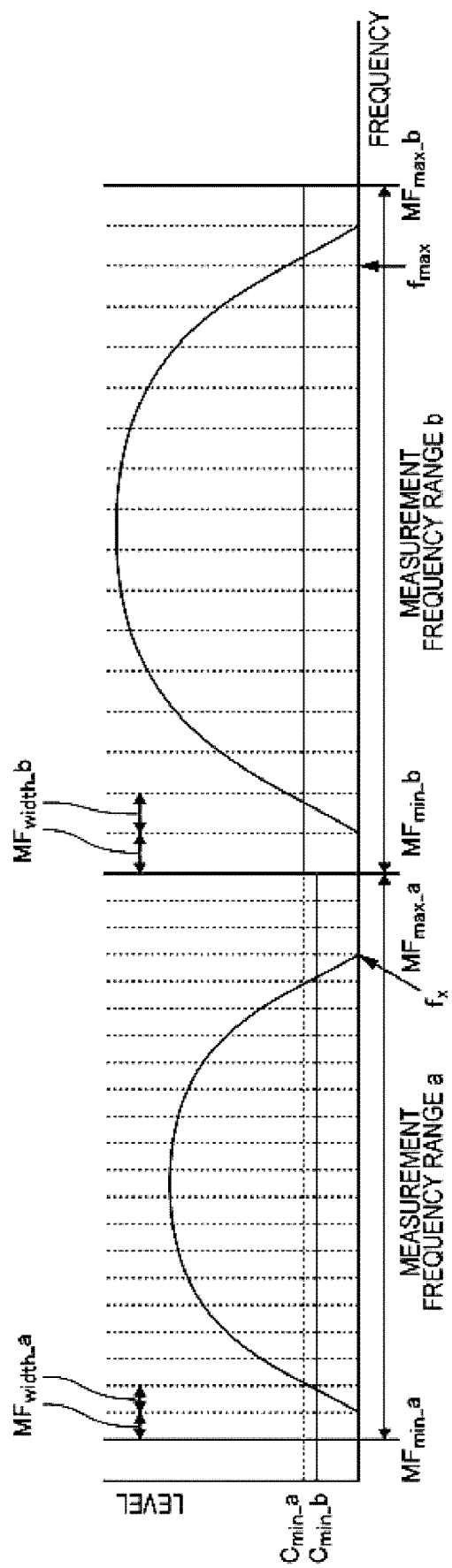
FIG. 3 is a diagram for explaining a method for measuring an electrical signal according to the embodiment.

FIG. 3 is a diagram for explaining a method for measuring an electrical signal with the measurement unit 24. Measurement of an electrical signal is performed through the following procedures A1 to A3.

(Procedure A1) The minimum measurement frequency $MF_{min}$ and the maximum measurement frequency $MF_{max}$ for determining the measurement width of an input signal, and the measurement frequency width $MF_{width}$ are determined in advance. The minimum measurement frequency $MF_{min}$ corresponds to the frequency at which the measurement is started, and the maximum measurement frequency $MF_{max}$ corresponds to the frequency at which the measurement is ended. The optical transmission apparatus 1 fixedly holds the values of the minimum measurement frequency $MF_{min}$, the maximum measurement frequency $MF_{max}$, and the measurement frequency width $MF_{width}$ in the storage unit 27 or the measurement unit 24.

The frequency band that can be amplified is determined by the characteristics of the amplification unit 22 and the amplification unit 23. Therefore, the optical transmission apparatus 1 may fixedly hold the maximum value of the frequency that can be amplified by the amplification unit 22 and the amplification unit 23, as the maximum measurement frequency $MF_{max}$ in the storage unit 27 or the measurement unit 24. Alternatively, the maximum measurement frequency $MF_{max}$ may be set in the storage unit 27 or the measurement unit 24 from the outside. The measurement frequency width $MF_{width}$ is the same as the width of the carrier of the input signal, which is the width of the frequency of the carrier signal included in the input signal.

In a case where there is a plurality of types of carrier signals, values of the minimum measurement frequency $MF_{min}$, the maximum measurement frequency $MF_{max}$, and the measurement frequency width $MF_{width}$ are set for each carrier signal type. Examples of carrier signal types include a broadcast signal using clockwise circularly polarized waves of satellite broadcasting, and a broadcast signal using counterclockwise circularly polarized waves of satellite broadcasting.

(Procedure A2) Before measurement of a carrier level that is the level of a carrier signal, a level threshold $C_{min}$ is determined. As in the above-described procedure, the optical transmission apparatus 1 may fixedly hold the threshold $C_{min}$ in the storage unit 27 or the measurement unit 24, or may allow the threshold $C_{min}$ to be set in the storage unit 27 or the measurement unit 24 from the outside. Also, in a case where there is a plurality of types of carrier signals, a value of the threshold $C_{min}$ may be set for each carrier signal type.

(Procedure A3) The measurement unit 24 starts the measurement of the electrical signal from the minimum measurement frequency $MF_{min}$. The measurement unit 24 measures the carrier level $c_i(f)$ of each of the n measurement frequencies included in the measurement frequency range from the minimum measurement frequency $MF_{min}$ to the maximum measurement frequency $MF_{max}$, while sliding the measurement frequency by the measurement frequency width $MF_{width}$ at each time. Note that i represents a carrier number (i=1, 2, . . . , n). In a case where the measurement unit 24 determines that $c_i(f)<C_{min}$ is satisfied, the measurement value is discarded, but the measurement frequency value at the time of the discarding is recorded in the storage unit 27 or the measurement unit 24. However, in a case where $c_i(f)<C_{min}$ is continuously satisfied, which is where $c_i(f)<C_{min}$ has also been satisfied in the previous measurement, the measurement unit 24 does not perform recording. The measurement unit 24 ends the measurement when the measurement frequency exceeds the maximum measurement frequency $MF_{max}$, and determines that the measurement frequency value satisfying $c_i(f)<C_{min}$ at that time is the maximum frequency $f_{max}$.

In FIG. 3, the measurement unit 24 determines the carrier level $c_i(f)$ (i=1, n) and the maximum frequency $f_{max}$ for each frequency (carrier) in each of the measurement frequency ranges a and b. The measurement frequency range a is a lower frequency range than the measurement frequency range b.

In the procedure A1 described above, the minimum measurement frequency $MF_{min\_a}$, the maximum measurement frequency $MF_{max\_a}$, and the measurement frequency width $MF_{width\_a}$ of the measurement frequency range a are determined first. Likewise, the minimum measurement frequency $MF_{min\_b}$, the maximum measurement frequency $MF_{max\_b}$, and the measurement frequency width $MF_{width\_b}$ of the measurement frequency range b are determined. In FIG. 3, the maximum measurement frequency $MF_{max\_a}$ and the minimum measurement frequency $MF_{min\_b}$ are the same, and the measurement frequency range a and the measurement frequency range b are adjacent to each other. However, the measurement frequency range a and the measurement frequency range b may not be adjacent to each other, and the maximum measurement frequency $MF_{max\_a}$ and the minimum measurement frequency $MF_{min\_b}$ may have different values.

Further, in the procedure A2, the threshold $C_{min\_a}$ for the carrier level to be used in the measurement frequency range a, and the threshold $C_{min\_b}$ for the carrier level to be used in the measurement frequency range b are determined. The threshold Cud, a and the threshold Cud, b may be the same, or may be different. The storage unit 27 or the measurement unit 24 stores the minimum measurement frequency $MF_{min\_a}$, the maximum measurement frequency $MF_{max\_a}$, the measurement frequency width $MF_{width\_a}$, and the threshold $C_{min\_a}$ for the carrier level in the measurement frequency range a, and the minimum measurement frequency $MF_{min\_b}$, the maximum measurement frequency $MF_{max\_b}$, the measurement frequency width $MF_{width\_b}$, and the threshold $C_{min\_b}$ for the carrier level in the measurement frequency range b.

In the procedure A3, the measurement unit 24 starts electrical signal measurement from the minimum measurement frequency $MF_{min\_a}$, and sequentially measures the carrier levels of frequencies $c_1(f)$, $c_2(f)$, . . . while incrementing the frequency by the measurement frequency width $MF_{width\_a}$ at each time. The measurement unit 24 records the frequency $f_x$ when the carrier level becomes lower than the threshold $C_{min\_a}$ for the first time after the carrier level becomes equal to or higher than the threshold $C_{min\_a}$. The frequency $f_x$ corresponds to the maximum frequency $f_{max}$ before the measurement frequency range b is measured. After the recording, the measurement unit 24 still continues the carrier level measurement until the frequency reaches the maximum measurement frequency $MF_{max\_a}$.

The measurement unit 24 then starts electrical signal measurement from the minimum measurement frequency $MF_{min\_b}$, and sequentially measures the carrier levels of frequencies $c_1(f)$, $c_2(f)$, . . . while incrementing the frequency by the measurement frequency width $MF_{width\_b}$ at each time. The measurement unit 24 records the frequency $f_y$ (>the frequency $f_x$) when the carrier level becomes lower than the threshold $C_{min\_b}$ for the first time after the carrier level becomes equal to or higher than the threshold $C_{min\_b}$. After the recording, the measurement unit 24 still continues the carrier level measurement until the frequency reaches the maximum measurement frequency $MF_{max\_b}$. After finishing the measurement, the measurement unit 24 sets the value of the highest frequency $f_y$ satisfying $c_i(f) \geq C_{min\_b}$ in the measurement frequency range b as the maximum frequency $f_{max}$.

Next, a method for calculating the center frequency of(c) with the control unit 25 is described. The control unit 25 calculates the center frequency of(c) through the following procedures B1 to B3.

(Procedure B1) The control unit 25 calculates the frequency deviation amount $d_i(f)$ of each carrier signal, using the measured carrier level $c_i(f)$. A calculation formula for the frequency deviation amount $d_i(f)$ is determined by the characteristics of the amplification unit 22 and the amplification unit 23 for electrical signals in the optical transmission apparatus 1. That is, this calculation formula varies with each apparatus, and therefore, any specific formula is not mentioned herein. The control unit 25 holds this calculation formula therein, and performs calculation on the basis of this calculation formula.

Figure 4:
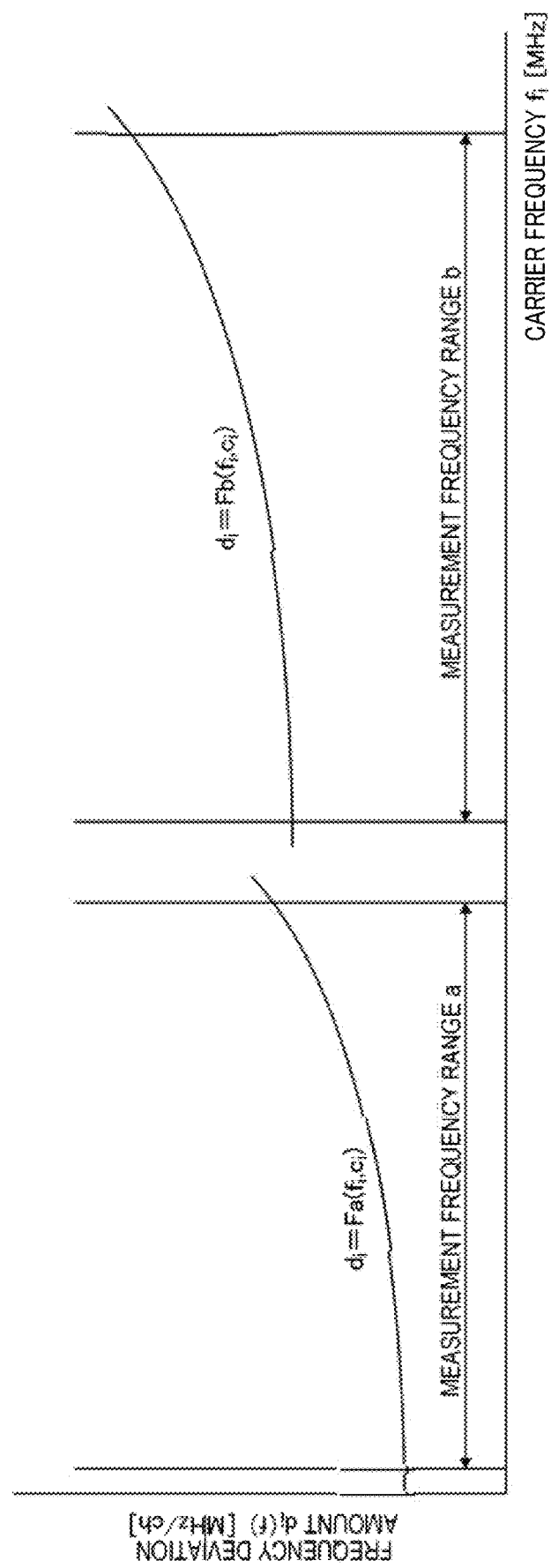
FIG. 4 is a diagram illustrating an example of a apparatus-specific frequency deviation amount according to the embodiment.

FIG. 4 is a diagram illustrating an example of a apparatus-specific frequency deviation amount $d_i(f)$. The control unit 25 calculates the frequency deviation amount $d_i(f)$ with a function $F(f_i, c_i)$ using the frequency $f_i$ and the input level $c_i$ of the ith carrier signal as parameters. The function $F(f_i, c_i)$ is unique to each apparatus. FIG. 4 illustrates the relationship between the carrier frequency $f_i$ [MHx] in the frequency measurement range a and the frequency deviation amount $d_i(f)$ [MHz] calculated with the function $Fa(f_i, c_i)$, and the relationship between the carrier frequency $f_i$ [MHx] in the frequency measurement range b and the frequency deviation amount $d_i(f)$ [MHz] calculated with the function $Fb(f_i, c_i)$.

(Procedure B2) Using the value of the frequency deviation amount $d_i(f)$ calculated in (1), the control unit 25 calculates the frequency deviation amount dtotal of the entire input signal (total deviation) according to Expression (1).

[Mathematical Expression 1]

$$d\text{total} = \Sum_{i=1}^{n} d_i^2(f) \quad (1)$$

(Procedure B3) On the basis of Carson's rule, the control unit 25 approximately calculates the center frequency of(c) according to Expression (2) shown below, using the frequency deviation amount dtotal calculated according to Expression (1) and the value of the maximum frequency $f_{max}$ indicated by the measurement data.

$$of(c) = d\text{total} + f_{max} \quad (2)$$

Note that Carson's rule is the following Expression (3) for calculating the frequency bandwidth W from the frequency deviation amount dtotal and the maximum frequency $f_{max}$.

$$W = 2(d\text{total} + f_{max}) \quad (3)$$

The center frequency is given by a half W/2 of the frequency bandwidth W. However, the conditions for applying Expressions (2) and (3) shown above are that the modulation index is lower than 1, and 95% or more of energy is concentrated.

Figure 5:
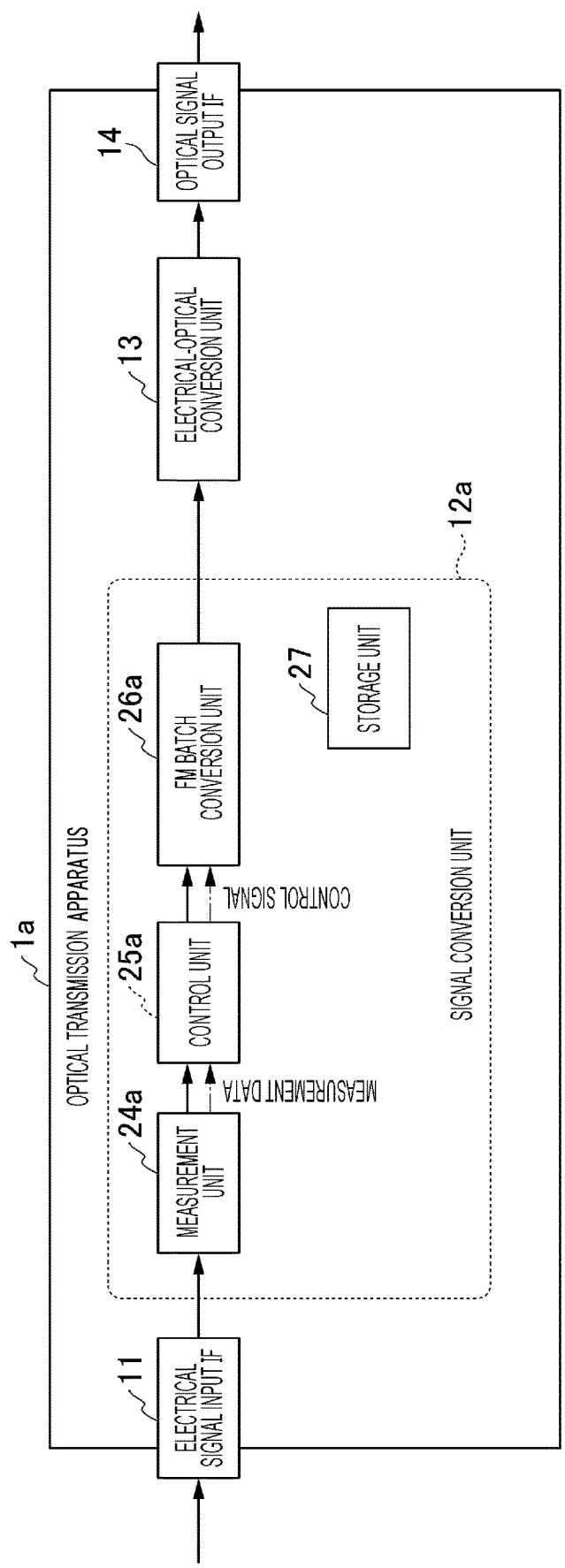
FIG. 5 is a configuration diagram of an optical transmission apparatus according to the embodiment.

Another example configuration of an optical transmission apparatus is illustrated in FIG. 5. FIG. 5 is a configuration diagram of an optical transmission apparatus 1a. In FIG. 5, the same components as those of the optical transmission apparatus 1 illustrated in FIG. 1 are denoted by the same reference numerals as those in FIG. 1, and explanation of them is not made herein. The optical transmission apparatus 1a differs from the optical transmission apparatus 1 illustrated in FIG. 1, in including a signal conversion unit 12a in place of the signal conversion unit 12. The signal conversion unit 12a includes a measurement unit 24a, a control unit 25a, and an FM batch conversion unit 26a. The signal conversion unit 12a may further include a storage unit 27.

The measurement unit 24a receives an input of an electrical signal from the electrical signal input IF 11, and performs measurement of the input electrical signal in the same manner as the measurement unit 24. The measurement unit 24a outputs measurement data and the electrical signal to the control unit 25a.

Using the measurement data received from the measurement unit 24a, the control unit 25a obtains the center frequency of(c) by calculation in the same manner as the control unit 25. The control unit 25a outputs a control signal for reporting the calculated center frequency of(c), and an electrical signal to the FM batch conversion unit 26a.

The FM batch conversion unit 26a operates in the same manner as the FM batch conversion unit 26, except for receiving an input of the control signal and the electrical signal from the control unit 25a. That is, the FM batch conversion unit 26a converts the input electrical signal into an FM batch conversion signal having the center frequency reported through the control signal, and outputs the converted FM batch conversion signal to the electrical-optical conversion unit 13. In a case where the FM batch conversion unit 30 illustrated in FIG. 2 is used as the FM batch conversion unit 26a, the optical modulation control unit 31 receives the control signal from the control unit 25a, and the bias tee 32 receives an input of the electrical signal from the control unit 25a.

Figure 6:
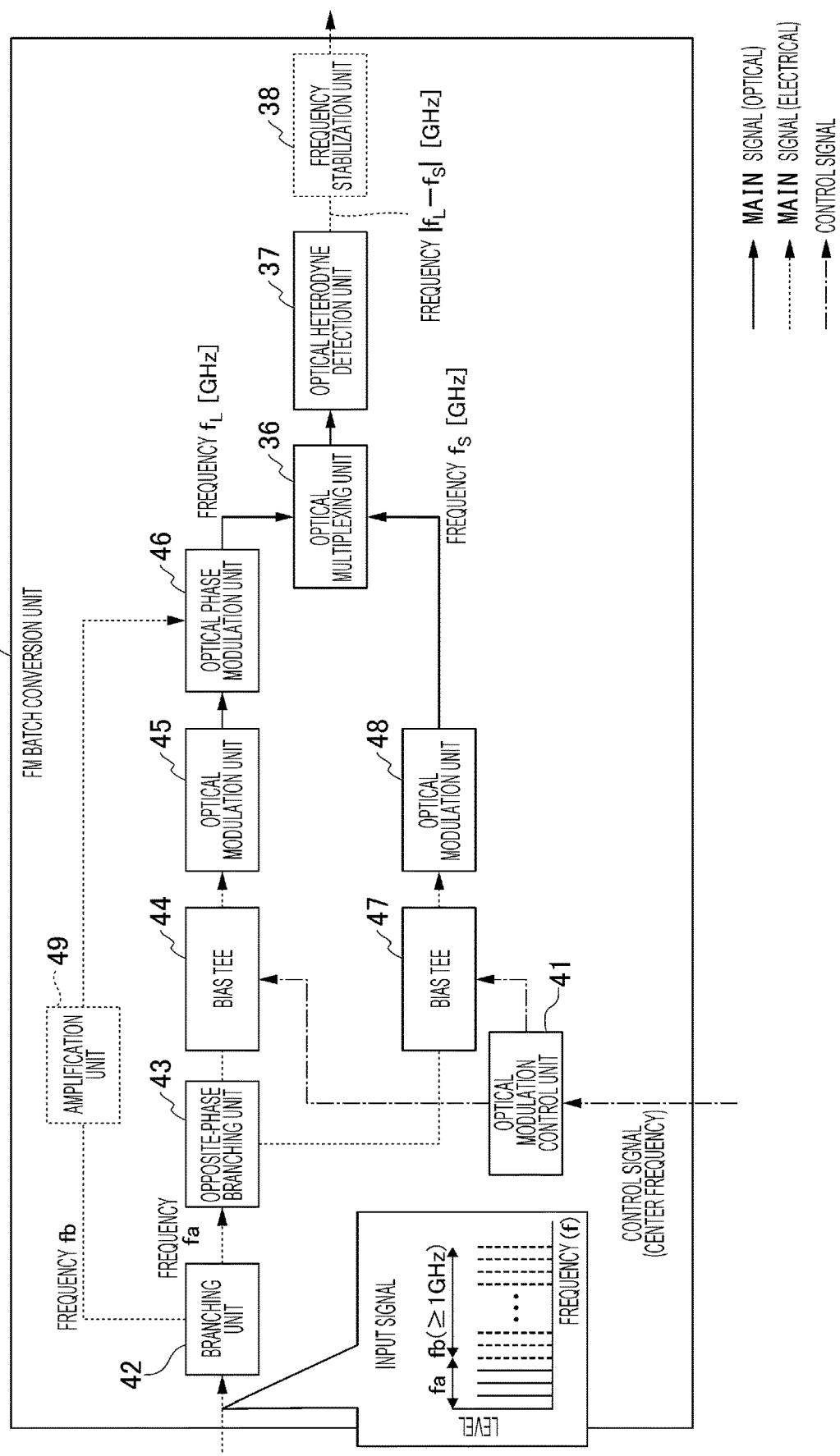
FIG. 6 is a configuration diagram of an FM batch conversion unit according to the embodiment.

Alternatively, an FM batch conversion unit 40 illustrated in FIG. 6 may be used as the FM batch conversion unit 26 of the optical transmission apparatus 1 or the FM batch conversion unit 26a of the optical transmission apparatus 1a. The FM batch conversion unit 40 receives an input of a broadband signal of 1 GHz or higher.

FIG. 6 is a diagram illustrating the configuration of the FM batch conversion unit 40. In this drawing, the same components as those of the FM batch conversion unit 30 illustrated in FIG. 2 are denoted by the same reference numerals as those in FIG. 2, and explanation of them is not made herein. The FM batch conversion unit 40 includes an optical modulation control unit 41, a branching unit 42 (hereinafter also referred to as "brancher"), an opposite-phase branching unit 43 (hereinafter also referred to as "opposite-phase brancher"), a bias tee 44 (hereinafter also referred to as "first application device"), an optical modulation unit 45 (hereinafter also referred to as "first optical modulator"), an optical phase modulation unit 46 (hereinafter also referred to as "optical phase modulator"), a bias tee 47 (hereinafter also referred to as "second application device"), an optical modulation unit 48 (hereinafter also referred to as "second optical modulator"), an optical multiplexing unit 36, and an optical heterodyne detection unit 37. The FM batch conversion unit 40 may further include an amplification unit 49, and may further include a frequency stabilization unit 38.

The optical modulation control unit 41 receives a control signal from the control unit 25 of the optical transmission apparatus 1 or the control unit 25a of the optical transmission apparatus 1a, and acquires information about the center frequency from the received control signal. On the basis of the center frequency indicated by the acquired information, the optical modulation control unit 41 controls the current value of the current to be applied by each of the bias tees 44 and 47. The optical modulation control unit 41 controls the bias tee 44 so that the frequency of the optical signal to be output from the optical phase modulation unit 46 becomes $f_L$ [GHz], and controls the bias tee 47 so that the frequency of the optical signal to be output from the optical modulation unit 48 becomes $f_S$ [GHz]. The optical modulation control unit 41 determines $f_L$ and $f_S$ so that the center frequency of the FM batch conversion signal of the frequency $|f_L - f_S|$ to be output from the optical heterodyne detection unit 37 becomes equal to the center frequency acquired from the control signal. The optical modulation control unit 41 implements an arithmetic algorithm or a table for determining a control value for the bias tee 44 and the bias tee 47, in accordance with the center frequency.

The FM batch conversion unit 40 receives an input of the electrical signal split by the branching unit 21 after the electrical signal has been output from the electrical signal input IF 11 of the optical transmission apparatus 1, or the electrical signal via the measurement unit 24a and the control unit 25a after the electrical signal has been output from the electrical signal input IF 11 of the optical transmission apparatus 1a. In a case where an electrical signal input by the FM batch conversion unit 40 contains a broadband component fb (1 GHz or higher), the branching unit 42 separates the broadband component fb from the input signal. The branching unit 42 outputs the input signal of a band fa excluding the broadband component to the opposite-phase branching unit 43, and outputs the broadband component fb of the input signal to the optical phase modulation unit 46. This is because the output of the optical modulation unit 45 is not stable (chirping), and therefore, the broadband component is separated for phase modulation. The amplification unit 49 amplifies the input signal of the frequency fb the branching unit 42 has output to the optical phase modulation unit 46.

The opposite-phase branching unit 43 generates an electrical signal of the opposite-phase component of the input signal of the band fa input from the branching unit 42, and splits the generated electrical signal into two signals. The opposite-phase branching unit 43 outputs one of the split electrical signals to the optical modulation unit 45, and outputs the other split electrical signal to the optical modulation unit 48. The electrical signal of the opposite-phase component is used for reducing the residual of the intensity modulation component in the FM batch conversion signal.

The bias tee 44 is an example of a DC application unit, and has the same configuration as the bias tee 32. The bias tee 44 applies, under the control of the optical modulation control unit 41, a DC current or a DC voltage to the electrical signal output from the opposite-phase branching unit 43 to the optical modulation unit 45.

The optical modulation unit 45 is an LD, for example. The optical modulation unit 45 oscillates laser light, by injecting the current of the electrical signal to which a DC current or a DC voltage is applied by the bias tee 44, into the LD. As a result, the optical modulation unit 45 performs intensity modulation on the electrical signal to convert the electrical signal into an optical signal having the frequency $f_L$, and outputs the optical signal to the optical phase modulation unit 46.

The optical phase modulation unit 46 modulates the phase of the optical signal output from the optical modulation unit 45 with the input signal having the frequency fb output from the branching unit 42, and generates an optical signal having the frequency $f_L$. The optical phase modulation unit 46 outputs the generated optical signal having the frequency $f_L$ to the optical multiplexing unit 36.

The bias tee 47 is an example of a DC application unit, and has the same configuration as the bias tee 32. The bias tee 47 applies, under the control of the optical modulation control unit 41, a DC current or a DC voltage to the electrical signal output from the opposite-phase branching unit 43 to the optical modulation unit 45.

The optical modulation unit 48 is an LD, for example. The optical modulation unit 48 oscillates laser light, by injecting the current of the electrical signal to which a DC current or a DC voltage is applied by the bias tee 47, into the LD. As a result, the optical modulation unit 48 performs intensity modulation on the electrical signal to convert the electrical signal into an optical signal having the frequency $f_S$, and outputs the converted optical signal to the optical multiplexing unit 36.

The optical multiplexing unit 36 multiplexes the optical signal of the frequency $f_L$ generated by the optical phase modulation unit 46 and the laser light of the frequency $f_S$ generated by the optical modulation unit 48, and outputs the optical signal generated by the multiplexing to the optical heterodyne detection unit 37.

By applying the optical transmission apparatus 1 or 1a of the embodiment described above to a transmission network using a FM batch conversion scheme, it is possible to generate an appropriate FM signal, without replacing the apparatus or a person with knowledge in the art changing the center frequency setting, even in a case where the maximum frequency of the input signal is high.

Also, even in a case where the maximum frequency of the input signal is low, there are the following advantages. Specifically, in a situation where the optical transmission apparatus 1 or 1a is used at the center frequency with the maximum frequency being set to the 3.2 GHz band, if the maximum frequency is changed to the 2.1 GHz band, a signal is generated at a higher value than the originally-required center frequency, though aliasing does not occur. Therefore, the center frequency is set in accordance with the 2.1 GHz band, so that the optical transmission apparatus 1 or 1a can reduce the influence of wavelength dispersion in the optical signal transmission path, and make the transmission distance longer than before. For example, in a case where the input signal is a video signal, the transmission distance becomes longer. Accordingly video signals can be sent to the regions in which video signals have not been appropriately received and viewing the video has not been possible.

The control unit 25 of the optical transmission apparatus 1 and the control unit 25a of the optical transmission apparatus 1a may include a central processing unit (CPU), a memory, an auxiliary storage device, and the like that are connected by a bus, and may achieve the functions of the above-described embodiment by executing a program. Note that all or some of the respective functions of the control unit 25 of the optical transmission apparatus 1 and the control unit 25a of the optical transmission apparatus 1a may be formed with hardware such as an application specific integrated circuit (ASIC), a programmable logic device (PLD), or a field programmable gate array (FPGA). The program for the control unit 25 of the optical transmission apparatus 1 and the program for the control unit 25a of the optical transmission apparatus 1a may be recorded in a computer-readable recording medium. The computer-readable recording medium refers to a portable medium such as a flexible disk, a magneto-optical disk, a read only memory (ROM), or a CD-ROM, or a storage device such as a hard disk included in a computer system, for example. The program for the control unit 25 of the optical transmission apparatus 1 and the program for the control unit 25a of the optical transmission apparatus 1a may be transmitted via a telecommunications line.

Figure 7:
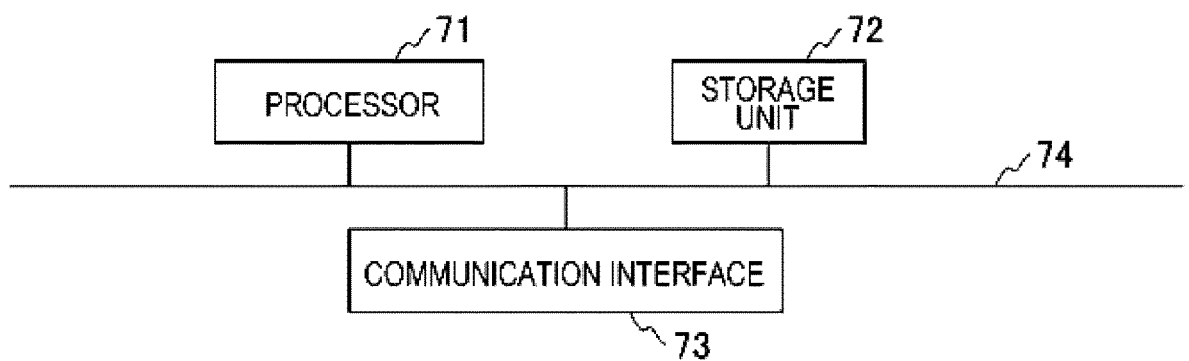
FIG. 7 is a diagram illustrating the hardware configuration of a control unit according to the embodiment.
Figure 8:
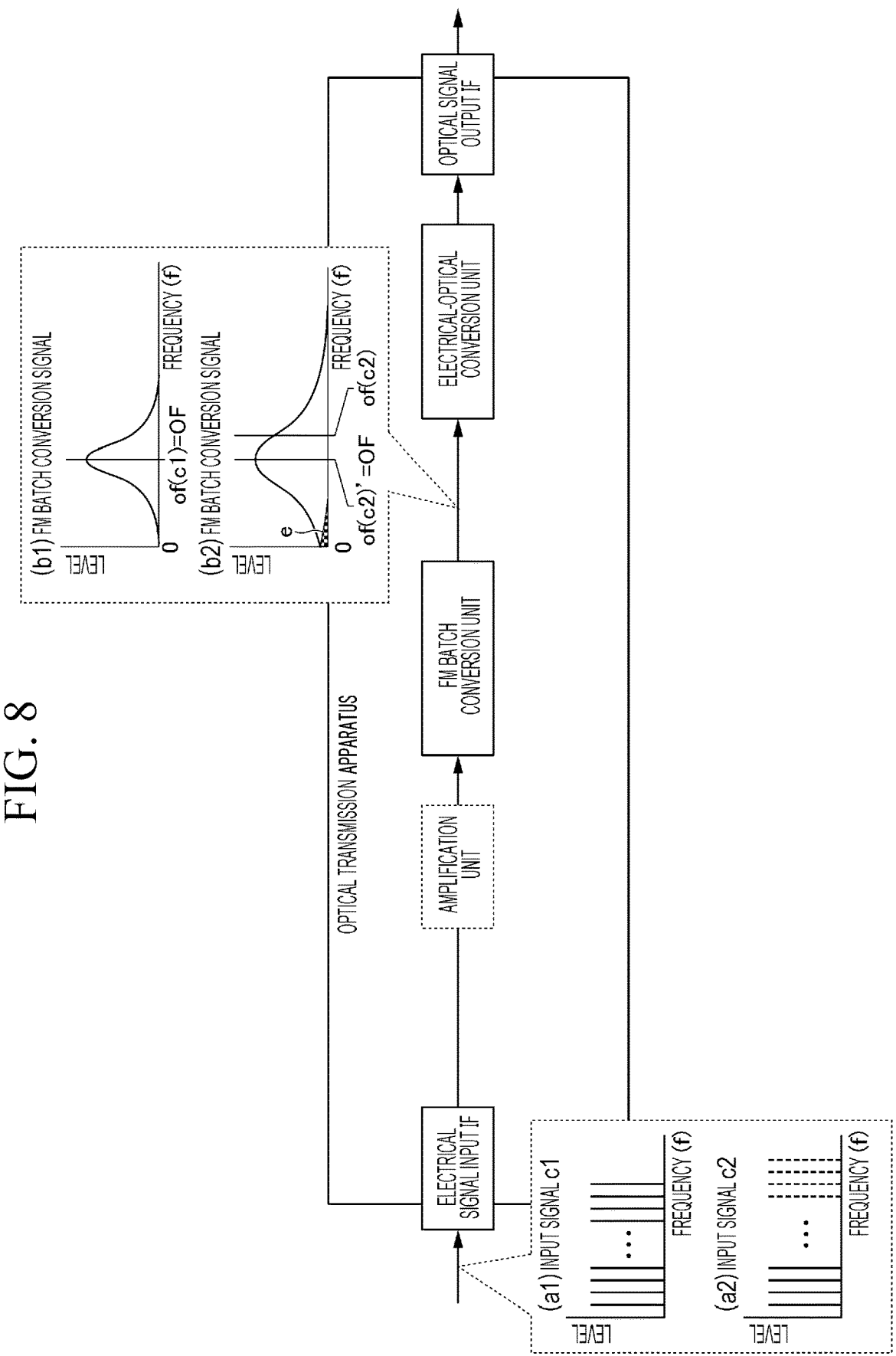
FIG. 8 is a configuration diagram of a conventional optical transmission apparatus.

An example hardware configuration of the control unit 25 of the optical transmission apparatus 1 and the control unit 25a of the optical transmission apparatus 1a is now described. FIG. 7 is a apparatus configuration diagram illustrating a an example hardware configuration of the control unit 25 of the optical transmission apparatus 1 and the control unit 25a of the optical transmission apparatus 1a. The control unit 25 of the optical transmission apparatus 1 and the control unit 25a of the optical transmission apparatus 1a include a processor 71, a storage unit 72, and a communication interface 73. The processor 71, the storage unit 72, and the communication interface 73 are connected to a bus 74. The processor 71 is a central processing device that performs calculation and control. The processor 71 is a CPU, for example. The storage unit 72 is a ROM, a random access memory (RAM), a solid-state drive, a hard disk drive, or the like. The processor 71 reads and executes the program from the storage unit 72. The storage unit 72 further includes a work area and the like to be used when the processor 71 executes various programs. The communication interface 73 is communicably connected to other functional units.

According to the above-described embodiment, it is possible to set an appropriate FM signal center frequency in accordance with the characteristics of the electrical signal to be input, and reduce signal degradation to be caused by optical signal transmission.

Note that a signal converting apparatus may include at least the signal conversion unit 12 or the signal conversion unit 12a.

According to the above-described embodiment, a signal converting apparatus includes a conversion unit, a measurement unit, and a control unit. For example, the signal converting apparatus is the optical transmission apparatus 1 or 1a of the embodiment. The conversion unit performs FM batch conversion on an input signal containing a plurality of carrier signals, to generate an FM signal. For example, the conversion unit is the FM batch conversion unit 30 or 40 of the embodiment. The measurement unit measures the carrier levels of the plurality of carrier signals contained in the input signal, and the maximum frequency of the input signal. The control unit calculates the frequency deviation amount of the entire input signal, using the frequency deviation amount calculated on the basis of the measured carrier levels of the respective carrier signals. Using the calculated frequency deviation amount and the measured maximum frequency, the control unit calculates a center frequency for the FM signal center frequency, and controls the conversion unit so that the center frequency of the FM signal to be generated by the FM batch conversion becomes equal to the calculated center frequency. For example, the control unit is the control unit 25, or the optical modulation control unit 31 or 41 of the embodiment.

The conversion unit may include an application unit, a first optical modulation unit, an electricity generation unit, a second optical modulation unit, an optical multiplexing unit, and a detection unit. The application unit applies a current or a voltage to an input signal. For example, the application unit is the bias tee 32 of the embodiment. The first optical modulation unit generates an optical signal subjected to intensity modulation with the input signal to which power or voltage has been applied. For example, the first optical modulation unit is the optical modulation unit 33 of the embodiment. The electricity generation unit generates electricity. The second optical modulation unit generates light subjected to intensity modulation with the electricity which has been generated by the electricity generation unit. For example, the second optical modulation unit is the optical modulation unit 35 of the embodiment. The optical multiplexing unit multiplexes the optical signal which has been generated by the first optical modulation unit and the light which has been generated by the second optical modulation unit. The detection unit performs optical heterodyne detection on the light which has been multiplexed by the optical multiplexing unit, to obtain the FM signal. For example, the detection unit is the optical heterodyne detection unit 37 of the embodiment. The control unit controls the application unit and the electricity generation unit so that the center frequency of the FM signal obtained by the detection unit becomes equal to the calculated center frequency. For example, the control unit controls the application unit and the electricity generation unit so that the center frequency of a difference between the frequency of the optical signal output from the first optical modulation unit and the frequency of the light output from the second optical modulation unit becomes equal to the calculated center frequency.

The conversion unit may include a branching unit, an opposite-phase branching unit, a first application unit, a first optical modulation unit, an optical phase modulation unit, a second application unit, a second optical modulation unit, an optical multiplexing unit, and a detection unit. The branching unit splits an input signal into a first electrical signal lower than a predetermined frequency, and a second electrical signal higher than the predetermined frequency. The opposite-phase branching unit splits an electrical signal having the opposite phase of the first electrical signal into a first opposite-phase signal and a second opposite-phase signal. The first application unit applies power or voltage to the first opposite-phase signal. For example, the first application unit is the bias tee 44 of the embodiment. The first optical modulation unit generates an optical signal subjected to intensity modulation with the first opposite-phase signal to which power or voltage has been applied. For example, the first optical modulation unit is the optical modulation unit 45 of the embodiment. The optical phase modulation unit subjects the optical signal which has been generated by the first optical modulation unit to phase modulation with the second electrical signal. The second application unit applies power or voltage to the second opposite-phase signal. For example, the second application unit is the bias tee 47 of the embodiment. The second optical modulation unit generates an optical signal subjected to intensity modulation with the second opposite-phase signal to which power or voltage has been applied. For example, the second optical modulation unit is the optical modulation unit 48 of the embodiment. The optical multiplexing unit multiplexes the optical signal which has been phase-modulated by the optical phase modulation unit and the optical signal which has been generated by the second optical modulation unit. The detection unit performs optical heterodyne detection on the optical signal which has been multiplexed by the optical multiplexing unit, to obtain the FM signal. For example, the detection unit is the optical heterodyne detection unit 37 of the embodiment. The control unit controls the first application unit and the second application unit so that the center frequency of the FM signal obtained by the detection unit becomes equal to the calculated center frequency. For example, the control unit controls the first application unit and the second application unit so that the center frequency of a difference between the frequency of the optical signal phase-modulated by the optical phase modulation unit and the frequency of the optical signal generated by the second optical modulation unit becomes equal to the calculated center frequency.

Although embodiments of the present invention have been described in detail with reference to the drawings so far, specific configurations are not limited to these embodiments, and include designs and the like without departing from the scope of the invention.

REFERENCE SIGNS LIST 1 optical transmission apparatus
1a optical transmission apparatus 11 electrical signal input IF
12 signal conversion unit
12a signal conversion unit
13 electrical-optical conversion unit
14 optical signal output IF
21 branching unit
22 amplification unit
23 amplification unit
24 measurement unit
24a measurement unit
25 control unit
25a control unit
26 FM batch conversion unit
26a FM batch conversion unit
27 storage unit
30 FM batch conversion unit
31 optical modulation control unit
32 bias tee
33 optical modulation unit
34 electricity generation unit
35 optical modulation unit
36 optical multiplexing unit
37 optical heterodyne detection unit
38 frequency stabilization unit
40 FM batch conversion unit
41 optical modulation control unit
42 branching unit
43 opposite-phase branching unit
44 bias tee
45 optical modulation unit
46 optical phase modulation unit
47 bias tee
48 optical modulation unit
49 amplification unit
71 processor
72 storage unit
73 communication interface
74 bus

The invention claimed is:

1. A signal converting apparatus comprising:
a convertor that performs frequency modulation (FM) batch conversion on an input signal containing a plurality of carrier signals, to generate an FM signal;
an analyzer that measures carrier levels of the plurality of carrier signals contained in the input signal, and a maximum frequency of the input signal; and
a controller that calculates a frequency deviation amount of the entire input signal on a basis of the measured carrier levels of the plurality of carrier signals, calculates a center frequency for the FM signal using the calculated frequency deviation amount and the measured maximum frequency, and controls the convertor so that a center frequency of the FM signal to be generated through the FM batch conversion becomes equal to the calculated center frequency.

2. The signal converting apparatus according to claim 1, wherein
the convertor includes:
an application device that applies a current or a voltage to the input signal;
a first optical modulator that generates an optical signal subjected to intensity modulation with the input signal to which power or voltage has been applied;
an electricity generator that generates electricity;
a second optical modulator that generates light subjected to intensity modulation with the electricity which has been generated by the electricity generator;
an optical multiplexer that multiplexes the optical signal which has been generated by the first optical modulator and the light which has been generated by the second optical modulator; and
a detector that performs optical heterodyne detection on the light which has been multiplexed by the optical multiplexer, to obtain the FM signal, and
the controller controls the application device and the electricity generator so that the center frequency of the FM signal to be obtained by the detector becomes equal to the calculated center frequency.

3. The signal converting apparatus according to claim 2 wherein
the controller controls the application device and the electricity generator so that a center frequency of a difference between a frequency of the optical signal output from the first optical modulator and a frequency of the light output from the second optical modulator becomes equal to the calculated center frequency.

4. The signal converting apparatus according to claim 1, wherein
the convertor includes:
a brancher that splits the input signal into a first electrical signal having a lower frequency than a predetermined frequency, and a second electrical signal having a higher frequency than the predetermined frequency;
an opposite-phase brancher that splits an electrical signal of an opposite phase of the first electrical signal into a first opposite-phase signal and a second opposite-phase signal;
a first application device that applies power or voltage to the first opposite-phase signal;
a first optical modulator that generates an optical signal subjected to intensity modulation with the first opposite-phase signal to which power or voltage has been applied;
an optical phase modulator that subjects the optical signal which has been generated by the first optical modulator to phase modulation with the second electrical signal;
a second application device that applies power or voltage to the second opposite-phase signal;
a second optical modulator that generates an optical signal subjected to intensity modulation with the second opposite-phase signal to which power or voltage has been applied;
an optical multiplexer that multiplexes the optical signal which has been phase-modulated by the optical phase modulator and the optical signal which has been generated by the second optical modulator; and
a detector that performs optical heterodyne detection on the optical signal which has been multiplexed by the optical multiplexer, to obtain the FM signal, and
the controller controls the first application device and the second application device so that the center frequency of the FM signal to be obtained by the detector becomes equal to the calculated center frequency.

5. The signal converting apparatus according to claim 4 wherein
the controller controls the first application device and the second application device so that a center frequency of a difference between a frequency of the optical signal phase-modulated by the optical phase modulator and a frequency of the optical signal generated by the second optical modulator becomes equal to the calculated center frequency.

6. A signal converting method comprising:

performing, by a convertor, frequency modulation (FM) batch conversion on an input signal containing a plurality of carrier signals, to generate an FM signal;

measuring, by an analyzer, carrier levels of the plurality of carrier signals contained in the input signal, and a maximum frequency of the input signal; and calculating, by a controller, a frequency deviation amount of the entire input signal on a basis of the measured carrier levels of the plurality of carrier signals, calculating a center frequency for the FM signal using the calculated frequency deviation amount and the measured maximum frequency, and controlling the convertor so that a center frequency of the FM signal to be generated through the FM batch conversion becomes equal to the calculated center frequency.

* * * * *